United States Patent [19]

Kano

[11] Patent Number: 4,939,578
[45] Date of Patent: Jul. 3, 1990

[54] METHOD OF DRIVING MULTIPLE CHIP CCD IMAGE SENSOR

[75] Inventor: Mitsunari Kano, Seto, Japan
[73] Assignee: Hitachi Ltd., Tokyo, Japan
[21] Appl. No.: 286,829
[22] Filed: Dec. 20, 1988
[30] Foreign Application Priority Data Dec. 21, 1987 [JP] Japan .............................. 62-321229

[51] Int. Cl.$^5$ .............................................. H04N 1/40
[52] U.S. Cl. ............................... 358/213.11; 358/482; 358/483
[58] Field of Search .............. 358/212, 213.11, 213.13, 358/294, 482–483; 250/578

[56] References Cited

U.S. PATENT DOCUMENTS

| | | | |
|---|---|---|---|
| 4,352,128 | 9/1982 | Ohori et al. | 358/294 |
| 4,432,022 | 2/1984 | Tokumitsu | 358/213.13 |
| 4,449,151 | 5/1984 | Yokota et al. | 358/294 |
| 4,532,551 | 7/1985 | Kurata et al. | 358/294 |
| 4,691,114 | 9/1987 | Hasegawa et al. | 250/578 |
| 4,712,134 | 12/1987 | Murakami | 358/213.13 |
| 4,742,240 | 5/1988 | Yamanishi et al. | 250/578 |

FOREIGN PATENT DOCUMENTS 61-161580 7/1986 Japan .

Primary Examiner—Stephen Brinich
Attorney, Agent, or Firm—Pennie & Edmonds

[57] ABSTRACT

In a method of driving an image sensor comprised of a plurality of image sensor chips to sequentially deliver image outputs from the image sensor chips, start signals are initially applied to all of the image sensor chips at the beginning of the drive timing, a shift clock is applied to only each one of the plurality of image sensor chips which is so selected as to deliver an image output, and image outputs are picked up from the individual image sensor chips by sequentially applying shift clocks to selected image sensor chips so as to provide a continuous sensor output signal, whereby no noise is superimposed on the sensor output signal and the quality of images in the image reader, facsimile equipment, OCR equipment and the like can be improved.

4 Claims, 5 Drawing Sheets

METHOD OF DRIVING MULTIPLE CHIP CCD IMAGE SENSOR

BACKGROUND OF THE INVENTION

This invention relates to a method of driving an image sensor provided in an image input port of an image scanner, a facsimile equipment, an OCR equipment and the like.

The contact type image sensor optically acts as an image sensor having an optical system with magnification of unity and in order to read a manuscript of, for example, A4 size, this image sensor is required to be so huge that its size is comparable to the lateral width of A4 size. To this end, a plurality of image sensor chips each having a size of, for example, about 7 cm which corresponds to one of three divisions of A4-size lateral width are juxtaposed on a substrate of ceramic or the like. Actually, this image sensor is equivalent to three independent image sensors which are optically interconnected together and for the sake of picking up sensor outputs over the entire A4 size, the individual sensors must be driven sequentially at timings which do not concur or conflict with each other. In a prior art as disclosed in, for example, JP-A-61-161580, one image sensor is relayed to another by simply driving these sensors at offset timings, raising a problem that a noise is superimposed on an image sensor output at a relaying portion.

The aforementioned prior art will be described more specifically with reference to FIG. 1.

Continuous application of a shift clock 101 to chips 1 to 3 is performed on common timing basis. A start signal is applied to a chip and an image output signal occurs subsequently. A start signal 102 for the chip 1, a start signal 104 for the chip 2 and a start signal 106 for the chip 3 are sequentially applied at the predeterminedly dephased relationship so that the delivery of image output signals 103, 105 and 107 may be continuous on the time axis. The continuous delivery of the image output signals from the chips 1 to 3 can be regarded as a continuous sensor output signal or can be handled as an output signal from one unitary image sensor chip.

However, in the prior art, in order to permit the continuous delivery of image output signals from the plurality of chips to be regarded as a continuous sensor output signal, a start pulse 109 for the chip 2, for example, is generated near the timing for an image output 108 of the preceding chip 1. As a result, a noise is superimposed on an end portion of the image output 108 as shown at dotted line in FIG. 1. Similarly, in the image output signals 105 and 107, noises as shown at dotted line are superimposed on end portions. Since the position of the start pulse 109 corresponds to the end portion of the image output from the preceding chip, noise is superimposed on the image output non-uniformly, resulting in a harmful noise which cannot be removed by means of the succeeding image signal processing circuit (not shown). This noise is particularly harmful to the image scanner adapted to receive data representative of light and shade of images with high fidelity.

It should therefore be understood that in the prior art, the plurality of image sensor chips are sequentially driven by simply relaying one chip to another at offset timings and consequently a noise is superimposed on the output signal from the sensor chip.

SUMMARY OF THE INVENTION

An object of the present invention is to provide a method of driving an image sensor by which no noise is superimposed on the sensor output signal under sequential driving of a plurality of image sensor chips.

According to the present invention, in order to accomplish the above object, in a method of driving an image sensor comprised of a plurality of image sensor chips to sequentially deliver image output signals from the image sensor chips, start signals are initially applied to all of the image sensor chips at the beginning of the drive timing, and the shift clock is sequentially applied to only each one of the plurality of image sensor chips which is so selected as to deliver an image output signal.

Since in accordance with the present invention the start signals for individual image sensor chips are initially applied to all of the chips simultaneously at the beginning of the drive timing, no start signal is generated after the delivery of image output signals from the image sensor chips begins.

Further, since the application of the shift clock to one image sensor chip does not overlap the delivery of an image output signal from another image sensor chip, any noise due to the shift clock is not superimposed on the image output signal.

When a plurality of image sensor chips are driven, the drive pulse for each chip typically has the amplitude which is 10 to 100 times the amplitude of the output signal delivered out of each chip and representing light and shade of image and so it always affects the image output signal to a great extent. The degree of the influence is determined by a pattern on a substrate of ceramic or the like used for packaging of the image sensor, a circuit pattern on a circuit board for generation of the drive signal and an internal pattern of an image sensor IC (MOS or CCD etc. is a kind of IC). In order to minimize the influence, it is necessary to preclude any signals which change at any of timings which are not related to output signal. In accordance with the present invention, the image sensor output signal may always be affected uniformly by a constant noise and any non-uniform noise is not superimposed on the output signal at impertinent timings. The uniformly applied noise can be corrected by the image signal processing circuit (not shown), thus doing no harm.

DESCRIPTION OF THE PREFERRED EMBODIMENTS

Figure 1:
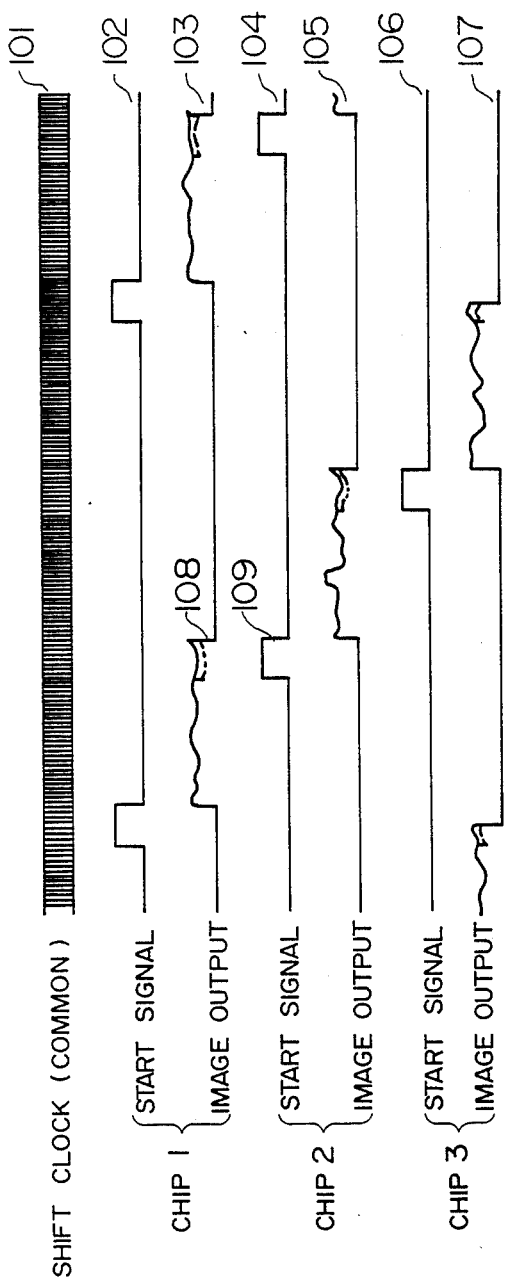
FIG. 1 is a timing chart illustrative of a prior art method for image sensor driving.
Figure 2:
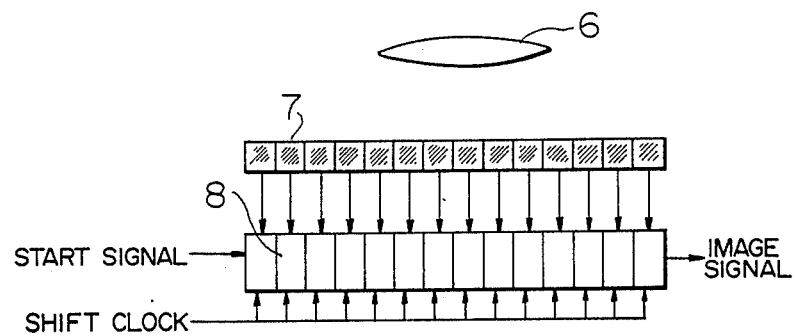
FIG. 2 conceptually illustrates the construction of an image sensor.

Before describing a preferred embodiment of the invention, a MOS or CCD image sensor to which the present invention is applied will first be described conceptually with reference to FIG. 2. A light receiving portion 7 of the image sensor generates electric charge under irradiation of light from a lens 6 and it is divided into small cells called pixels. Electric charge from each pixel is sequentially transferred by means of a scan mechanism 8 activated by a start signal to provide an image signal. As the scan mechanism 8, a CCD is used in a CCD image sensor and a MOS analog switch and a shift register are used in combination in the case of a MOS image sensor.

Figure 3:
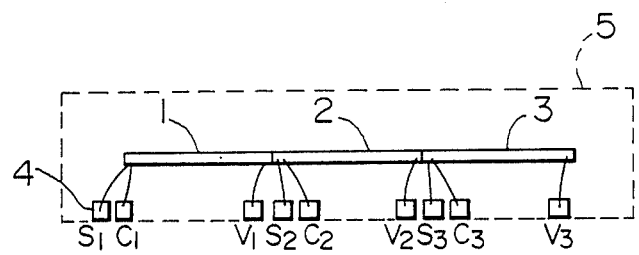
FIG. 3 conceptually illustrates a contact type image sensor comprised of a plurality of chips.

In particular, a contact type image sensor 5 to which the present invention is applied is illustrated in FIG. 3. The contact type image sensor is comprised of MOS or CCD image sensor chips 1 to 3 which are provided on a substrate of ceramic or the like through die bonding process and separate signal terminals 4 extend from each chip. Thus, the individual sensor chips adjoin each other and in some applications they share the common earth terminal. In packaging, a drive circuit for each chip is therefore disposed in proximity thereto.

Figure 4:
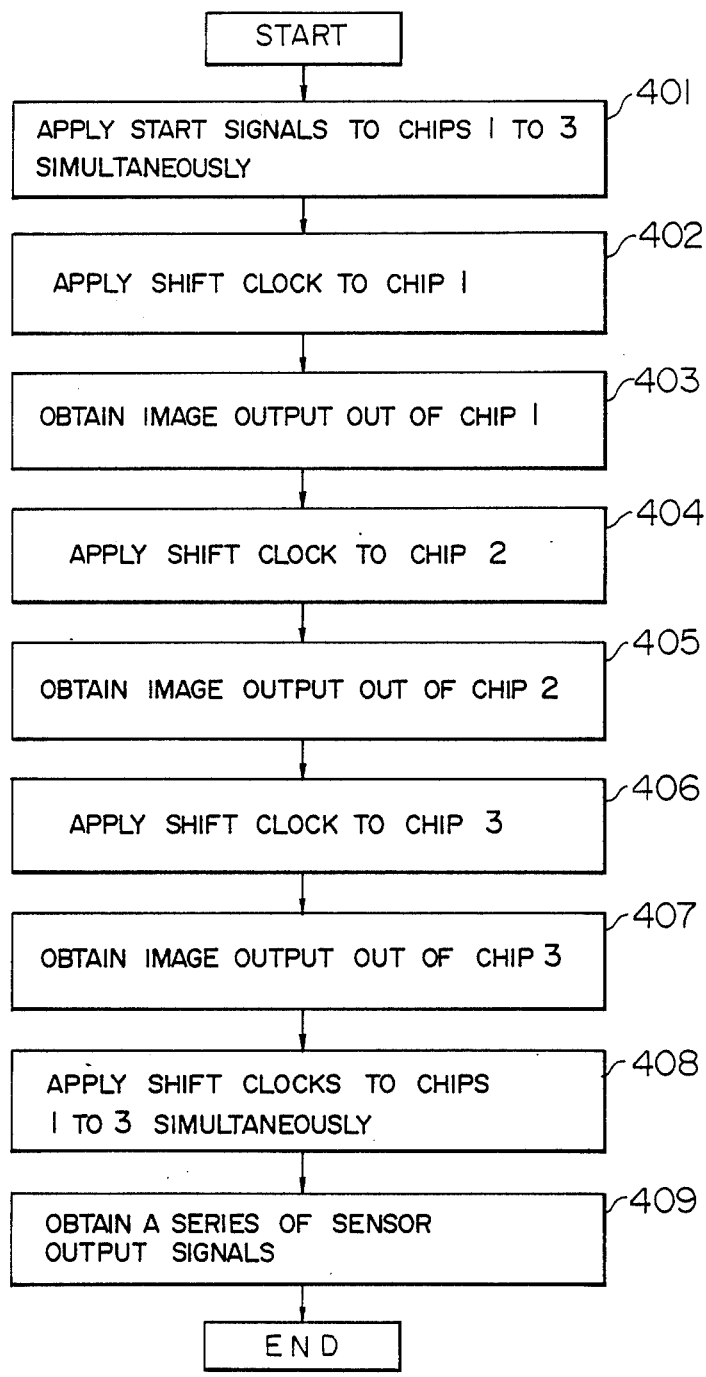
FIG. 4 is a flow chart showing an image sensor driving method according to an embodiment of the invention.
Figure 5:
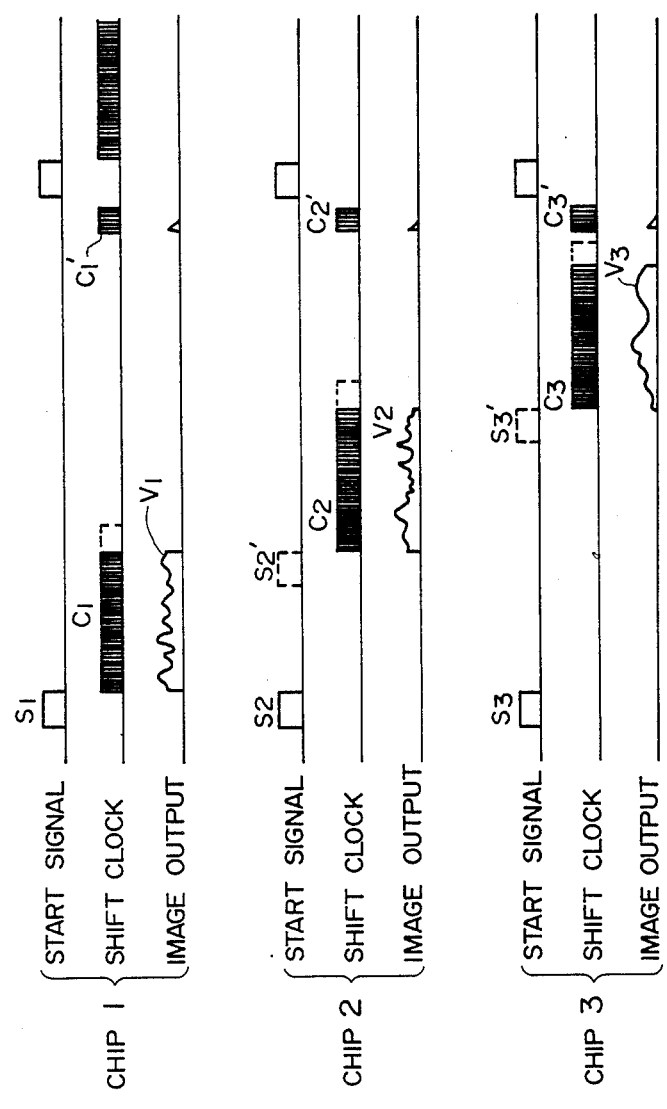
FIG. 5 is a timing chart illustrative of the FIG. 4 driving method.

Referring now to FIGS. 4 and 5, a method of driving the image sensor according to an embodiment of the present invention will be described. As an example, a contact type image sensor comprised of three chips is driven in this embodiment.

Firstly, start signals S1, S2 and S3 are applied simultaneously to the chips 1 to 3 at the beginning of the drive timing (step 401).

Then, a shift clock C1 (solid-line portion) having pulses corresponding to the number of pixels outputted from the chip 1 is applied to the chip 1 (step 402). At that time, the supply of shift clocks to the remaining chips 2 and 3 is stopped. In this manner, an image output $v_1$ is obtained (step 403).

Subsequently, a shift clock C2 (solid-line portion) having pulses corresponding to the number of pixels of the chip 2 is applied to the chip 2 (step 404). At that time, the supply of shift clocks to the remaining chips 1 and 3 is stopped. Thus, an image output $v_2$ is obtained (step 405).

Subsequently, a shift clock C3 (solid-line portion) having pulses corresponding to the number of pixels of the chip 3 is applied thereto (step 406). At that time, the supply of shift clocks to the remaining chips 1 and 2 is stopped. Thus, an image output $v_3$ is obtained (step 407).

After the image output from the chip 3 has been obtained in this manner, shift clocks C'1, C'2 and C'3 are applied simultaneously to the chips 1 to 3, as necessary, to discharge residual electric charge in the CCD (step 408). The image outputs are sequentially delivered to provide a continuous sensor output signal (step 409).

The start signal herein referred to is a start pulse or in the case of the CCD type image sensor, a transfer gate drive signal.

As far as the prior art driving method is concerned, not only start signals S'2 and S'3 as shown at dotted line in FIG. 5 are used but also dotted-line clock portions contiguous to the trailing edge of clocks C1 to C3 are applied as clocks which correspond to the clocks C'1 to C'3 for the sake of discharging residual electric charge, with the result that these signals and clocks overlap or interfere with part of each of the image outputs $v_1$ to $v_3$ shown in FIG. 5 and adversely affect the overlapping part of the image output by, for example, causing offset in this part. In contrast therewith, in accordance with the driving method of the present invention, the drive signals for the individual chips including start signals S1, S2 and S3 and shift clocks C1, C2 and C3 do not apply non-uniform noises to the image outputs $v_1$, $v_2$ and $v_3$, respectively. Since the start signals do not at all overlap the individual image outputs and the shift clocks overlap the entirety of the individual image outputs, no partial offset occurs and noise uniformly applied to the image output can be corrected easily.

Figure 6:
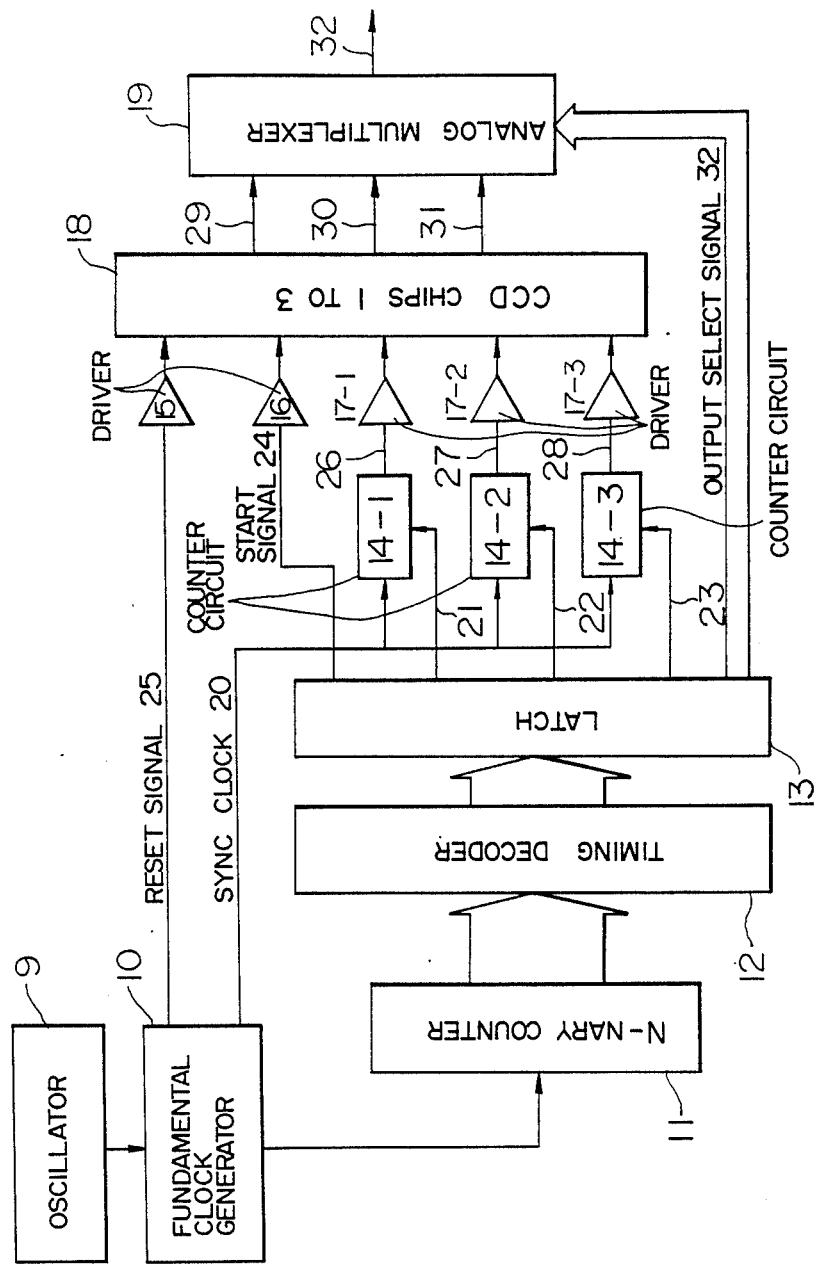
FIG. 6 is a block diagram illustrating an embodiment of a control circuit used for image sensor driving.

Referring to FIG. 6, there is illustrated, in block form, an embodiment of a control circuit used to drive a CCD image sensor.

A fundamental clock generator 10 responsive to the output signal of an oscillator 9 generates a fundamental timing and a reset signal. An N-nary counter 11 counts N clocks corresponding to the total control period to supply addresses to a timing decoder 12. A latch 13 responsive to the output signal of the decoder 12 is operable to eliminate whisker-like components in logical signals so as to provide necessary control timings.

Counter circuits 14-1 to 14-3 respond to the control timings to supply shift clocks 26, 27 and 28 to chips 1 to 3, generally designated at 18, and these circuits receive a sync clock 20 from the fundamental clock generator 10 and count enable signals 21, 22 and 23 from the latch 13. The timing decoder 12 also delivers a start signal 24 which is concurrently applied in common to the chips 1 to 3.

A reset signal 25 is applied to the CCD chip 18 including chips 1 to 3 through a driver 15 and the start signal 24 and shift clock signals 26, 27 and 28 are applied to the CCD chip 18 through drivers 16, 17-1, 17-2 and 17-3, respectively.

Output signals 29, 30 and 31 from the chips 1, 2 and 3 of CCD chip 18 are applied to an analog multiplexer 19 and sequentially delivered out of the multiplexer 19 in accordance with an output select signal 32 from the latch 13 to provide a continuous sensor output signal 32.

As described above, according to the present invention, the adverse influence of the image sensor drive signal by which a non-uniform offset is caused in the image signal can be avoided and the quality of images in the image reader, facsimile equipment, OCR equipment and the like can be improved.

I claim:

1. A method of driving an image sensor comprised of a plurality of image sensor chips to sequentially deliver image outputs from said image sensor chips, comprising the steps of:
    initially applying start signals to all of said image sensor chips at the beginning of the drive timing;
    applying a shift clock for an image output to only each one of said plurality of image sensor chips which is so selected as to deliver an image output;
    taking out image output sequentially from the individual image sensor chips by sequentially applying shift clocks to selected image sensor chips so as to provide a continuous sensor output signal; and
    applying shift clocks for discharging residual electric charge in each image sensor chip after an image output has been delivered out of the final image sensor chip.

2. An image sensor driving method according to claim 1 wherein the application of shift clocks to other image sensor chips than an image sensor chip so selected as to deliver an image output is stopped.

3. An image sensor driving method according to claim 1 wherein the shift clock applied to each chip has pulses corresponding to the number of pixels of each chip.

4. An image sensor driving method according to claim 1, wherein said start signal is a start pulse or a transfer gate drive signal.

* * * * *